No. 843,836.  PATENTED FEB. 12, 1907.
J. W. McMANIMAN.
ATTACHMENT FOR MOTOR ARMATURES.
APPLICATION FILED OCT. 11, 1906.
2 SHEETS—SHEET 1.
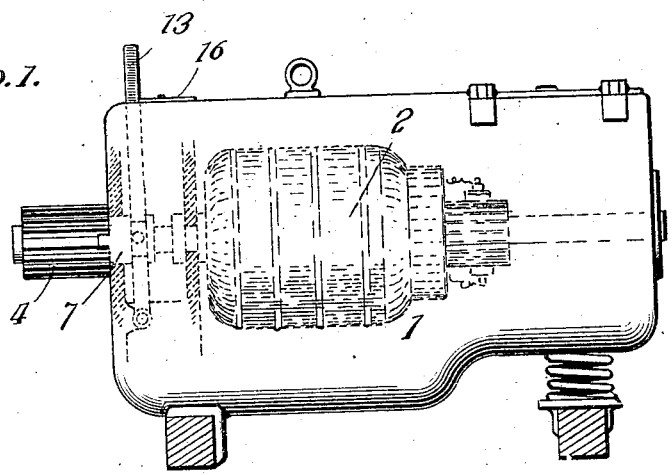
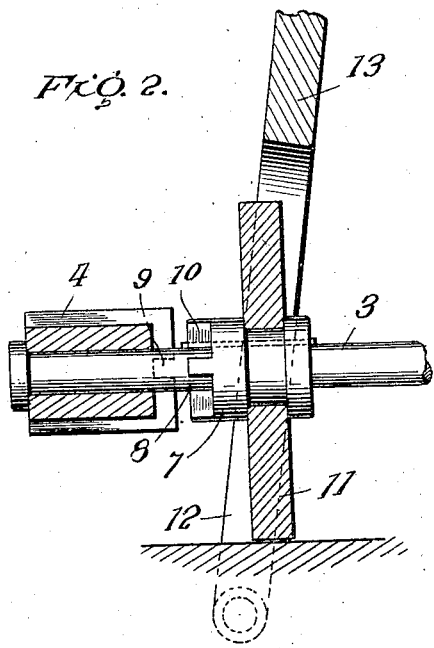
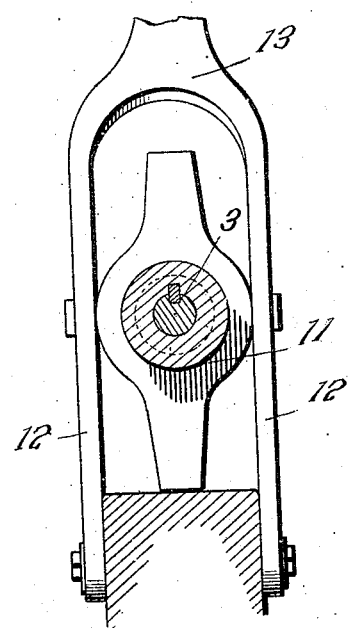

No. 843,836. PATENTED FEB. 12, 1907.
J. W. McMANIMAN.
ATTACHMENT FOR MOTOR ARMATURES.
APPLICATION FILED OCT. 11, 1906.
2 SHEETS—SHEET 2.
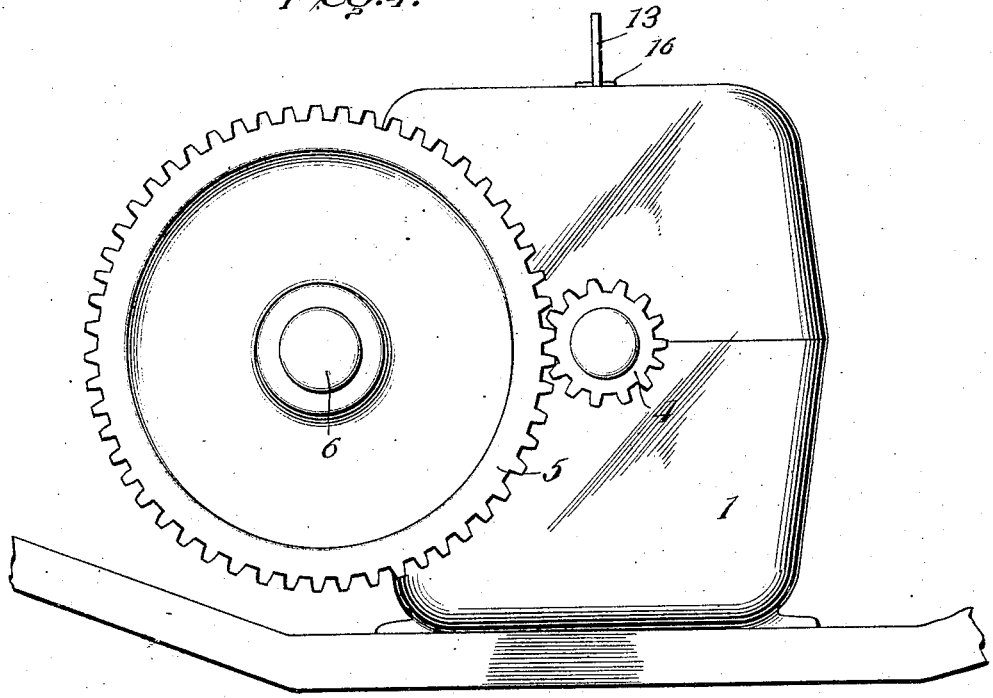
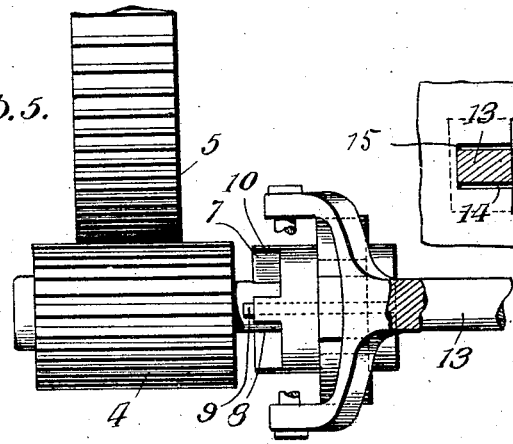
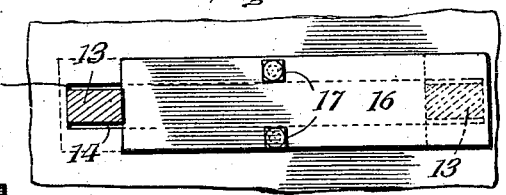

UNITED STATES PATENT OFFICE.

JOSEPH W. McMANIMAN, OF WASHINGTON, NEW JERSEY.

ATTACHMENT FOR MOTOR-ARMATURES.

No. 843,836.　　　　Specification of Letters Patent.　　　Patented Feb. 12, 1907.

Application filed October 11, 1906. Serial No. 338,476.

*To all whom it may concern:*

Be it known that I, JOSEPH W. MCMANIMAN, citizen of the United States, residing at Washington, in the county of Warren and State of New Jersey, have invented certain new and useful Improvements in Attachments for Motor-Armatures, of which the following is a specification.

This invention contemplates certain new and useful improvements in electric motors and armatures therefor, particularly electric motors and armatures as used to propel the cars of electric street-railway systems.

As at present ordinarily constructed and installed the trolley-cars and other cars of street-railway systems are propelled by means of two or more motors and their armatures, the shafts of the armatures being provided with pinions fixed thereon meshing with gear-wheels direct on the supporting-axles of the car. It has been found that a serious source of annoyances and expense has been caused by this method of gearing motor-armatures to the axles which they drive because the gearing has been a direct and positive one, always in mesh. Hence, as is manifest, if one of the armatures should be broken or otherwise incapacitated for use, as by cross-circuiting or the like, it has been impossible to continue the operation of the car thus equipped, owing to the fact that the disabled armature by its direct gearing is forced to continue its revolutions and become permanently injured by the breaking of the bands or the wiring and the stripping of the armature, causing the windings to tear and resulting in great damage to the working parts of the motor. As an indirect result of the present method of gearing, above noted, considerable financial and other economical loss ensue, owing to the fact that a car thus arranged if not continued on its run loses its proportion of travel and results in a monetary loss to the company. It is the primary object of my invention to avoid these difficulties; and to this end the invention consists of providing the armature-shafts of the motors with pinions that are loose thereon and are adapted to be readily coupled and uncoupled by suitable clutch devices to and from driving engagement with the car-axles and armature-shafts, whereby whenever necessary one or more of the armatures may be instantly put out of commission and disconnected entirely from the rotating axle of the car, so that the car may continue upon its journey by means of the other armatures without any further motion, as above noted, as to the disabled armature.

With this and other objects in view, as will more fully appear as the description proceeds, the invention consists in certain arrangements, combinations, and constructions of parts, as will be readily pointed out in the appended claims.

For a full understanding of the invention and the merits thereof and also to acquire a knowledge of the details of construction of the means for effecting the result reference is to be had to the following description and accompanying drawings, in which—

Figure 1 is a side elevation of the motor embodying the improvements of my invention. Fig. 2 is an enlarged detail section view of the clutch mechanism. Fig. 3 is a sectional view on the line $x\,x$ of Fig. 2. Fig. 4 is a side elevation illustrating the application of the invention to the truck of a street-railway car. Fig. 5 is a fragmentary top plan view of the clutch mechanism, and Fig. 6 is a detail top plan view illustrating the means for locking the actuating-handle of the clutch.

Corresponding and like parts are referred to in the following description and indicated in all the views of the drawings by the same reference characters.

The present embodiment of my invention illustrates an improved motor-case 1, mounted within the framework of the car-truck and inclosing the field-magnets, commutators, and brushes and driving-armature, the latter being designated 2. Upon the shaft 3 of the armature is mounted a loose pinion 4, which is designed to be always in mesh with the larger or main gear-wheel 5 on the driving-axle 6. Also mounted upon the shaft 3 and held to turn therewith, but capable of sliding longitudinally thereon, is a preferably grooved clutch-collar 7, which in the present instance is provided with a polygonal aperture received upon the correspondingly-shaped portion 8 of the shaft so as to obtain the desired sliding and rotary movement. The collar 7 is provided with a plurality of face-recesses 9, designed to receive the complemental tongues 10 on the adjacent face of the loose pinion 4, so as to couple said pinion with the shaft. To actuate the clutch device constituted by the collar 7 and the tongues of the pinion 4, I have provided in the present instance a yoke 11, pivotally mounted between the ends 12 of a bifurcated lever or actuating-handle 13, the said ends of the lever being mounted to rest upon any suitable support, such as the bottom of the shell or case 1, which incloses the entire operative parts of the motor.

The handle or lever 13 is intended to extend upwardly through the top of the shell or case 1 underneath the floor of the car, where it will work in the slot 14 and be engaged at the limit of its movement in the notch 15. It may be held locked by means of a lid 16, fastened to the case by means of one or more screws 17, as shown.

In the practical use of my improved attachment for motor-armatures it is evident that whenever it becomes necessary for the motorman or conductor of the car to place any one or more of the armatures out of commission for the purposes set forth at the outset of the specification it will only be necessary for him to lift up a section of the floor of the car, which is ordinarily made removable, and then by releasing the small thumbscrews that hold the lid 16 in position he may pull back the lever 13 so as to uncouple the clutch from the armature-shaft, then put down the lid again and fasten it so as to secure it in a position to hold the parts inoperative, and at the completion of this operation it is manifest that the car may proceed on its journey until it reaches the barn or even until the work of the day is ended, after which the armature can be repaired and be ready to proceed with the regular run in the morning.

From the foregoing description, in connection with the accompanying drawings, it will be seen that my invention will save considerable time and money, as it will enable any one or more of the motor-armatures to be rendered inoperative and held stationary without affecting any of the other armatures and without the necessity of either stopping the car entirely at the moment the armature becomes disabled and also without the necessity of operating the car with the disabled armature still in gear, which would result in the disastrous stripping and injurious effects above specified.

While I have shown and described my improved attachment for motor-armatures in connection with electric railway systems, it is obvious that the invention is not limited thereto, but may be equally adapted to motor-armatures generally in all classes of work with the same beneficial results.

It is obvious that the clutch-collar 7 may be mounted to slide on the armature-shaft 3 and held to turn therewith by a feather connection or by making a portion of the shaft square and forming the bore of the clutch-collar correspondingly.

Having thus described the invention, what is claimed as new is—

1. In a car of the character described, the combination with a motor, its case, its armature and shaft, and the driving-axle of the car, of a driving-gear loose on the armature-shaft and operatively connected to the driving-axle, a clutch-collar mounted to slide on said shaft and held to turn therewith and arranged for engagement with the driving-gear on said shaft, and means for operating said collar, said means including a lever provided with an upwardly-projecting handle and means for locking the handle to the case of the motor, at the limit of movement of said lever.

2. In a car of the character described, the combination with a motor, its case, its armature and shaft, and the driving-axle of the car, of a driving-gear loose on the armature-shaft and operatively connected to the driving-axle, a clutch-collar mounted to slide on said shaft and held to turn therewith and arranged for engagement with the driving-gear on said shaft, and means for operating said collar, said means including a lever provided with an upwardly-projecting handle, the case being provided with a slot in which said handle works and with a removable lid adapted to lock the lever at the limit of its movement.

In testimony whereof I affix my signature in presence of two witnesses.

JOSEPH W. McMANIMAN. [L. S.]

Witnesses:
　WILLIAM SHIPMAN,
　HIRAM W. ALLEGER.